March 7, 1944. J. R. BRYANT 2,343,396
COMBINED GROUND WORKING AND SOIL PULVERIZING MACHINE
Filed July 4, 1942 5 Sheets-Sheet 1

Inventor
James Russell Bryant

By Clarence A. O'Brien
and Harvey B. Jacobson Attorneys

March 7, 1944.    J. R. BRYANT    2,343,396
COMBINED GROUND WORKING AND SOIL PULVERIZING MACHINE
Filed July 4, 1942    5 Sheets-Sheet 2
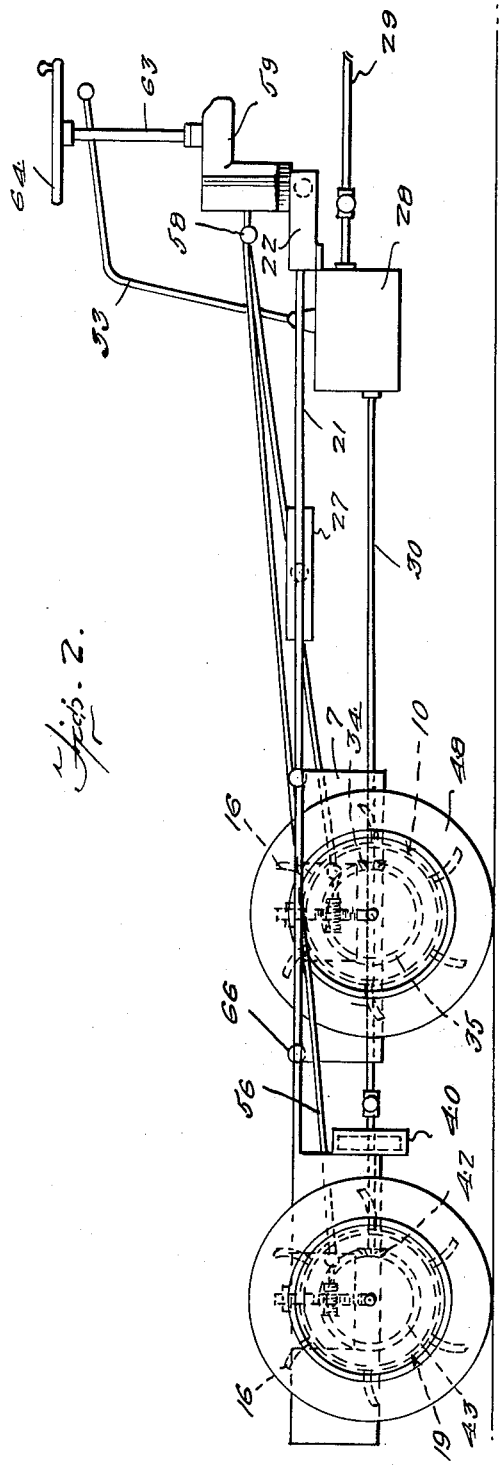
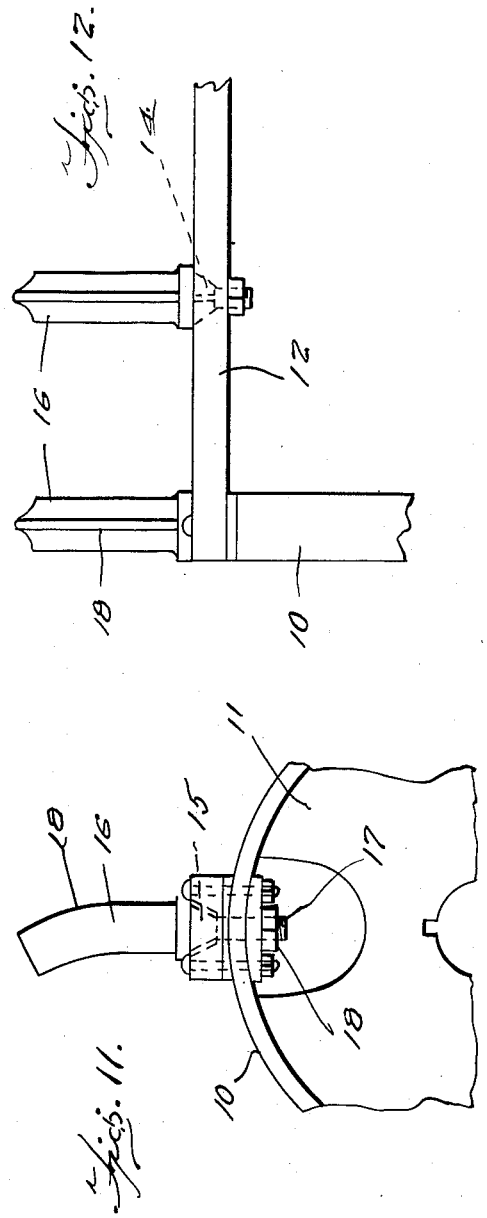
Inventor
James Russell Bryant
By Clarence A. O'Brien
and Harvey B. Jacobson    Attorneys March 7, 1944.  J. R. BRYANT  2,343,396
COMBINED GROUND WORKING AND SOIL PULVERIZING MACHINE
Filed July 4, 1942  5 Sheets-Sheet 3
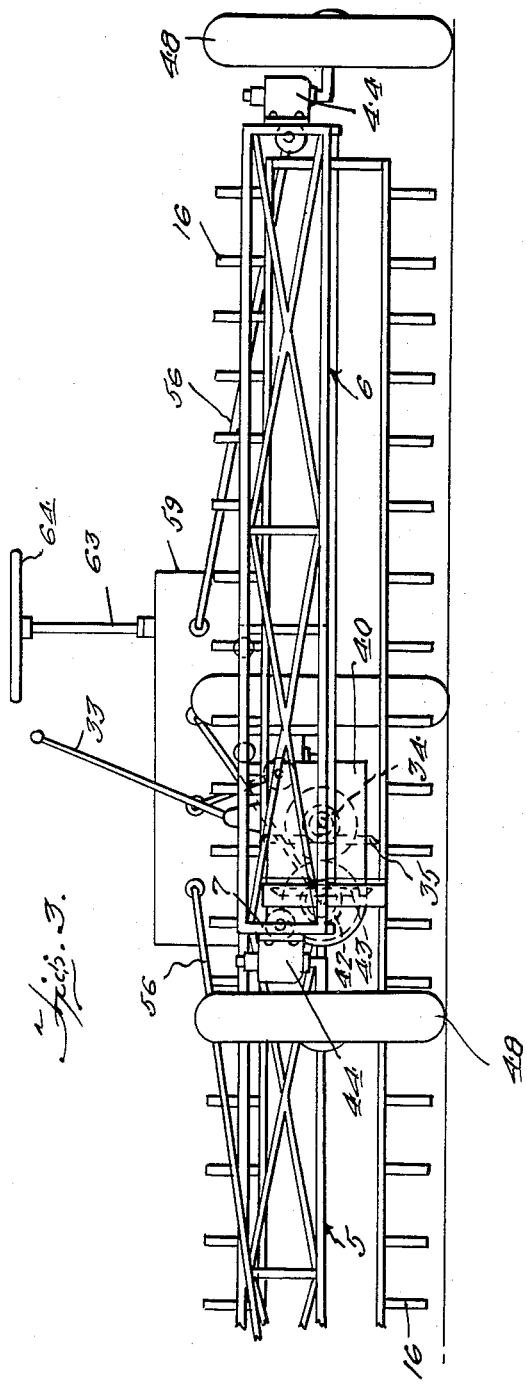
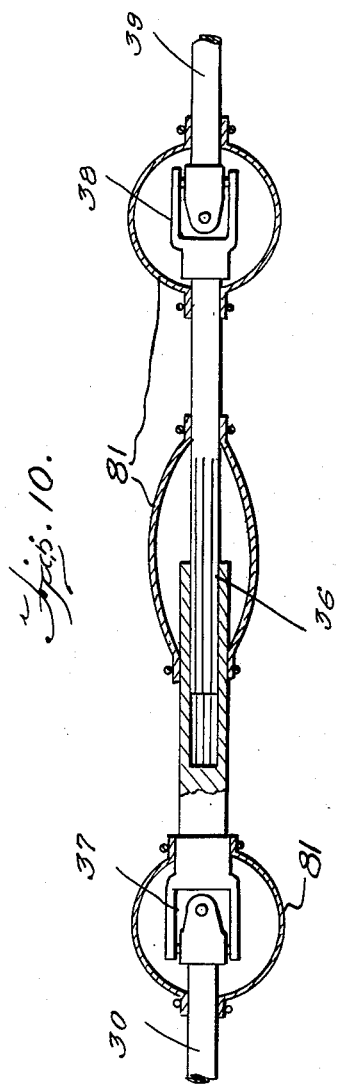
Inventor
James Russell Bryant
By Clarence A. O'Brien
and Harvey B. Jacobson, Attorneys

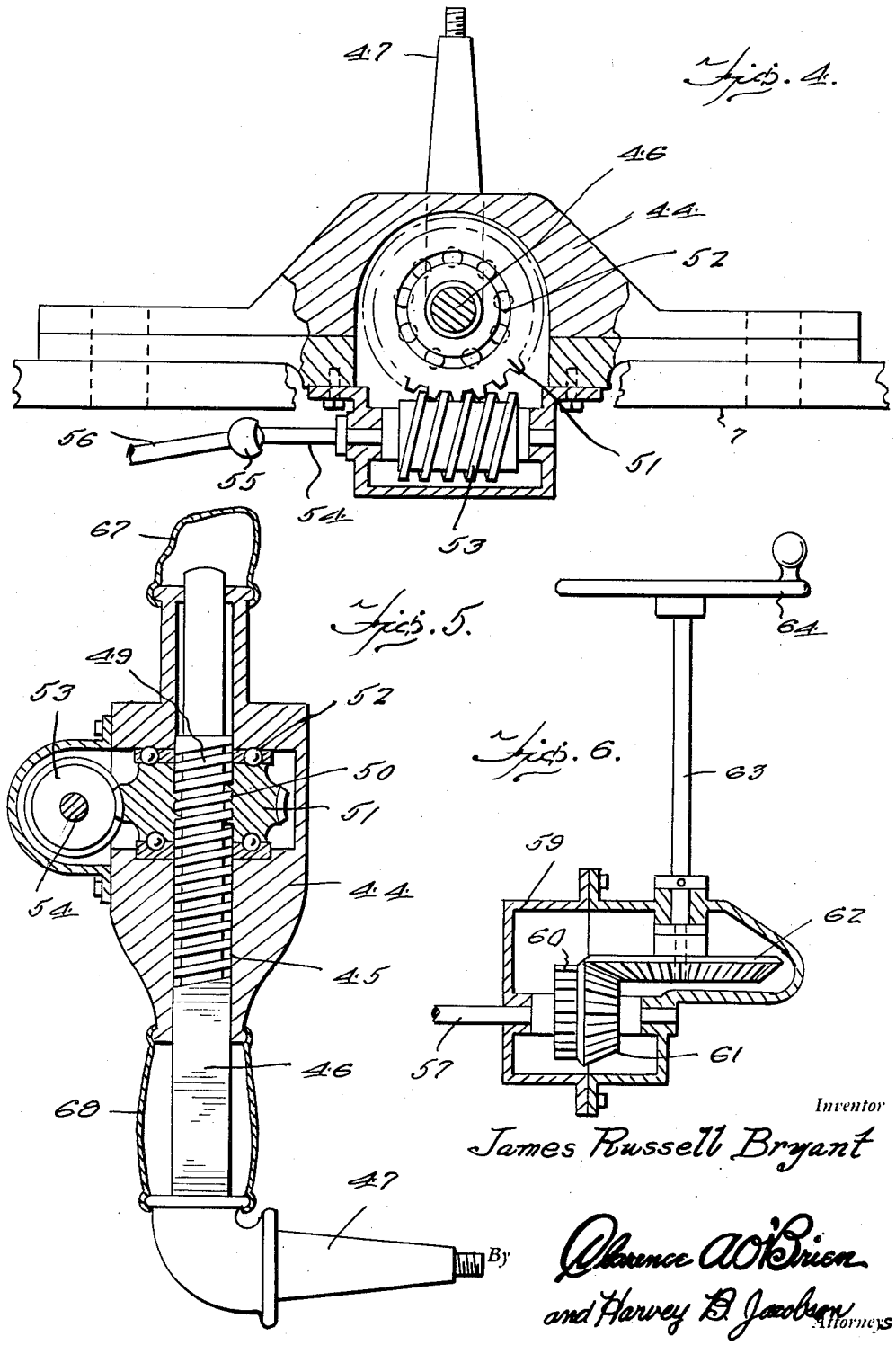

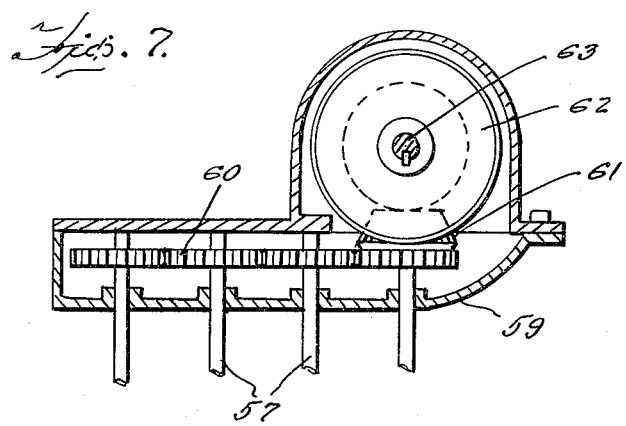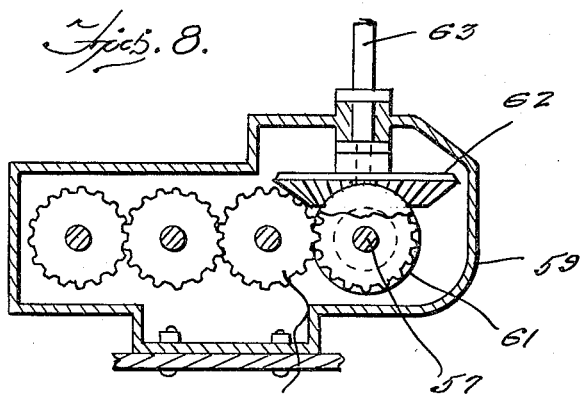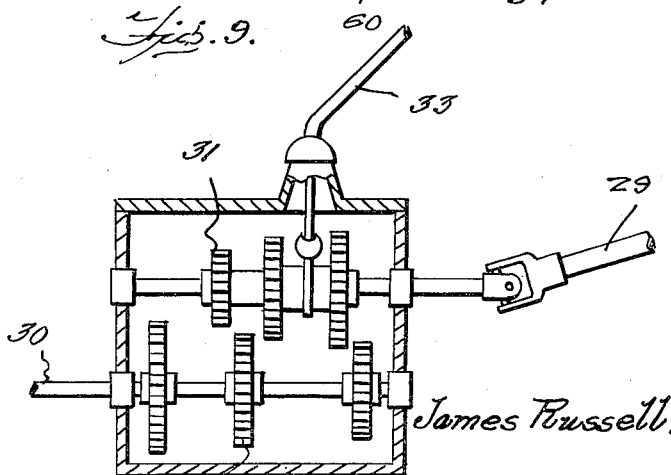

Patented Mar. 7, 1944

2,343,396

UNITED STATES PATENT OFFICE 2,343,396

COMBINED GROUND WORKING AND SOIL PULVERIZING MACHINE

James Russell Bryant, Oshawa, Ontario, Canada

Application July 4, 1942, Serial No. 449,793

2 Claims. (Cl. 97—40)

The present invention relates to new and useful improvements in farm implements and has for its primary object to provide a machine adapted for working the soil and also for breaking up the hard lumps of earth over which the machine is travelling.

An important object of the present invention is to provide a machine of this character equipped with a pair of rotating soil pulverizers disposed transversely of the machine and arranged in overlapping relation for working a strip of ground of a width equal to the entire width of the machine, and providing drive means for the pulverizers extending to a power take-off from a tractor employed for pulling the machine over the ground.

A further important object of the present invention is to provide a frame for each of the soil pulverizing elements and providing a ball and socket connection for the adjacent edges of the frames to provide for independent movement of the frame while the machine is travelling over uneven surfaces.

A still further object is to provide ground wheels for each of the frames embodying means for vertical adjustment thereof to regulate the height of the pulverizing elements with respect to the ground.

An additional object is to provide a machine of this character of simple and practical construction, which is efficient and reliable in performance, relatively inexpensive to manufacture and maintain in operation, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout and in which:

Figure 2 is a side elevational view.

Figure 3 is a fragmentary rear elevational view.

Figure 4 is a horizontal sectional view through the gear housing of one of the adjustable wheel mountings.

Figure 5 is a vertical sectional view therethrough.

Figure 6 is a vertical sectional view through the gear housing for the master operating wheel for adjusting the several wheels.

Figure 7 is a transverse sectional view through the gear housing for the master adjusting gear.

Figure 8 is a vertical sectional view therethrough.

Figure 9 is a vertical sectional view through the transmission housing.

Figure 10 is a fragmentary side elevational view with parts in section and showing the splined joint for the drive shaft between the front and rear rotary elements.

Figure 11 is a fragmentary end elevational view of one of the rotary elements, and Figure 12 is a fragmentary longitudinal sectional view thereof.

Figure 1:
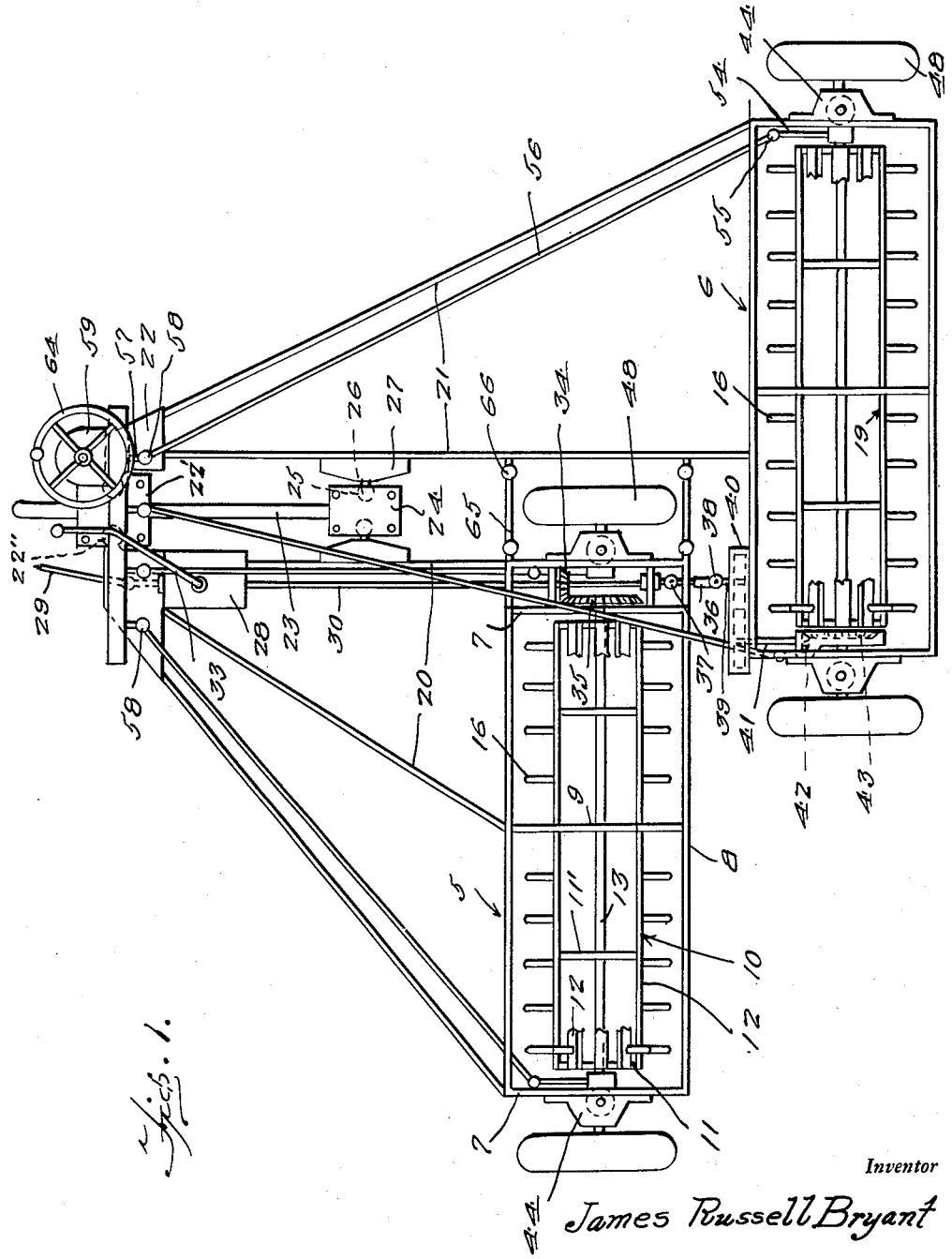
Figure 1 is a top plan view.

Referring now to the drawings in detail, wherein for the purpose of illustration I have disclosed a preferred embodiment of the invention, the numerals 5 and 6 designate a pair of frame members, each including end plates 7 and transversely and longitudinally extending frame members 8 and 9, respectively.

As shown to advantage in Figure 1 of the drawings, the frame member 5 is disposed in advance of the frame member 6 and the adjacent ends thereof are disposed in overlapping relation.

A rotary soil working element 10 is carried by the frame 5 and includes end plates 11 and intermediate plates 11' connected by slats 12, the end plates being secured on a shaft 13 having its ends journaled in the end plates 7 of the frame member. At spaced intervals, the slats 12 are formed with tapered countersinks having grooves 14 therein in which are conformably fitted the ribbed tapered portions 15 of earth working elements 16 having a shank 17 extending through the slats and secured thereto by nuts 18. The ribs and grooves prevent turning of the shanks in the slats. The earth working elements 16 project radially from the drums 10 with their outer ends curved rearwardly and having a longitudinal rib 18 on one edge thereof.

The frame member 6 is likewise provided with a drum designated generally at 19 constructed similarly to the drum 10 and likewise journaled in the side members of the frame.

Projecting forwardly from each of the frame members 5 and 6 are a plurality of beams 20 and 21, the front ends of the beams being connected to a sectional plate 22, the sections of which are hingedly connected along their adjacent longitudinal edges to a plate 22' by balls and sockets 22'', the plate 22' being attached to a drawbar 23 which projects forwardly from the machine. The rear end of the drawbar is provided with a plate 24 having sockets 25 in its opposite sides for swively receiving balls 26 projecting inwardly from the side edges of plates 27 secured to the respective frame members 20 and 21.

Secured to the frame member 20 is a transmission gear housing 28 having a drive shaft 29 extending forwardly from its front end for operation from a conventional power takeoff of a tractor to which the pulverizing machine is attached. A driven shaft 30 extends from the rear of the housing 28, the inner ends of the shafts 29 and 30 having a conventional form of transmission gearing 31 and 32 connected therewith to provide a three-speed drive which is controlled by a gear shift lever 33.

The driven shaft 30 is provided with a bevel gear 34 engaging a ring gear 35 on the inner end of the drum 10, the shaft 30 extending rearwardly from the front frame 5 and is connected to a splined shaft section 36 having universal joints 37 and 38 at its front and rear ends for connection with a shaft section 39 extending into a gear housing 40 secured to the front end of the frame section 6. A shaft section 41 extends from the gear housing 40 and to which a bevel gear 42 is secured for driving a ring gear 43 on the adjacent end of the drum 10.

Secured to each of the end plates 7 of the respective frame members 5 and 6, is a gear housing 44 having a vertical bore 45 extending therethrough and in which is positioned a vertical screw 46 having a wheel spindle 47 extending laterally at its lower end, the spindle having a wheel 48 journaled thereon and the lower end of the bore 45 and screw 46 are of square shape in cross-section to prevent turning of the screw.

Threads 49 are formed on the screw 46 for engaging the internal threads 50 of a gear 51 journaled in the housing 44 by bearing assemblies 52. The worm gear 51 is operatively engaged by a worm 53 secured on a shaft 54, the shaft 54 being connected by means of a universal joint 55 to a forwardly extending shaft 56, each of the shafts 56 being connected at their front ends to a shaft 57 by means of a universal joint 58. The shaft 57 projects into a gear housing 59 which is supported at the front end of the machine on the plate 22' and is provided with interengaged gears 60 journaled therein, one of the gears 60 being driven by means of a pinion 61 from a master gear 62 secured on the lower end of a shaft 63 which projects upwardly through the housing 59 and is provided at its upper end with a manipulating wheel 64.

Each of the wheels, at the opposite ends of the frames 5 and 6, are provided with one of the vertically adjustable screws 46 operated through the wheel 64 whereby to vertically adjust the wheel and accordingly to raise or lower the frames 5 and 6 together with the rotating drums 10 and 10 respectively mounted thereon.

As more clearly illustrated in Figure 1 of the drawings, the frame members 20 and 21, to which the respective frames 5 and 6 are attached, are connected to each other adjacent their rear ends by spaced parallel transversely extending frame members 65 having universal joints 66 at each end thereof to permit independent vertical movement of the respective frame members 5 and 6 as the machine travels over uneven surfaces of the ground.

Flexible covers 67 and 68 are mounted at the upper and lower ends of the housing 44 and enclose the respective ends of the vertical screws 46 to permit dirt from entering the housing.

A conventional form of lubrication system may be provided for the moving parts of the machine and all bearing joints may be sealed from dust and dirt by felt washers and flexible fabric covers, such as shown at 81 in Figure 10.

It is believed the details of construction and manner of use of the device will be readily understood from the foregoing without further detailed explanation.

Having thus described the invention what I claim is:

1. A ground pulverizer comprising a pair of wheel supported frames, said frames extending transversely of the machine, and arranged in overlapping endwise relation with one frame forwardly of the other frame, a toothed pulverizing drum rotatably mounted on each frame, a forwardly extending towing frame connected to each of said first-named frames, said second frames being hingedly connected to each other along a longitudinal center line, spaced parallel transversely extending frame members swivelly connecting the overlapping end of the front frame member to the towing frame of the rear frame member drive means for the drums including a forwardly extending driven shaft, and means for vertically adjusting the frames on the wheels.

2. A ground pulverizing machine comprising a pair of frames extending transversely of the machine, means swivelly connecting the frames in endwise overlapping relation, a rotary pulverizing element mounted on each frame, drive means for said element, a gear housing on the end of each frame, a screw mounted for vertical sliding movement in the housing, a wheel spindle on the lower end of the screw and having a wheel mounted thereon, a chamber in the housing, an internally threaded gear on the screw in the chamber, bearing assemblies between the gear and the upper and lower walls of the chamber, and manually operated means connected to the respective gears for the simultaneous actuation thereof.

JAMES RUSSELL BRYANT.